United States Patent [19]

Le Goff

[11] Patent Number: 5,366,667

[45] Date of Patent: Nov. 22, 1994

[54] TRICKLING FILM GAS-LIQUID CONTACTOR AND USE

[75] Inventor: Pierre Le Goff, Nancy, France

[73] Assignee: Pechiney Recherche, Courbevoie, France

[21] Appl. No.: 120,907

[22] Filed: Sep. 15, 1993

[30] Foreign Application Priority Data

Sep. 15, 1992 [FR] France ................. 92 11234

[51] Int. Cl.⁵ .............................................. B01F 3/04
[52] U.S. Cl. .................................... 261/153; 261/156; 261/110; 261/155; 165/116
[58] Field of Search ............... 165/116, 115; 261/153, 261/156, 110, 155

[56] References Cited

U.S. PATENT DOCUMENTS

| | | | |
|---|---|---|---|
| 651,017 | 6/1990 | Navone | 165/115 |
| 673,180 | 4/1901 | Tassell | 165/116 |
| 709,094 | 9/1902 | Howe | 165/116 |
| 1,357,938 | 11/1920 | Beckett | 165/115 |
| 3,199,962 | 8/1965 | Whitaker | 261/110 |
| 3,969,448 | 7/1976 | Limebeer | 165/115 |
| 4,477,396 | 10/1984 | Wilkinson | 261/155 |
| 4,507,175 | 3/1985 | Le Goff | |
| 4,573,330 | 3/1986 | van der Sluys et al. | |
| 4,648,441 | 3/1987 | Van de Sluys et al. | 261/156 |
| 5,195,578 | 3/1993 | Le Goff et al. | |

OTHER PUBLICATIONS

Chemical Abstracts, vol. 82, No. 4, 17583W, Jan. 27, 1975.

*Primary Examiner*—Tim Miles
*Attorney, Agent, or Firm*—Dennison, Meserole, Pollack & Scheiner

[57] ABSTRACT

A contactor for the transfer of matter and heat between gas and liquid comprising a helical support of heat conductive material allowing the flow of a liquid to be treated, a wall of heat conductive material and in thermal contact with the said support, separating in sealing-tight manner the said liquid and a heat exchanging fluid, characterized in that the said support and the said wall are formed by a vertical stack of open work plates of a heat conductive material, offset angularly in respect of one another by rotation according to the axis of the said support, each plate thus forming an element of the said support, like a step of a spiral staircase, and an element of the said wall, in such a way as to obtain an economical and efficient evaporator or absorber.

35 Claims, 12 Drawing Sheets

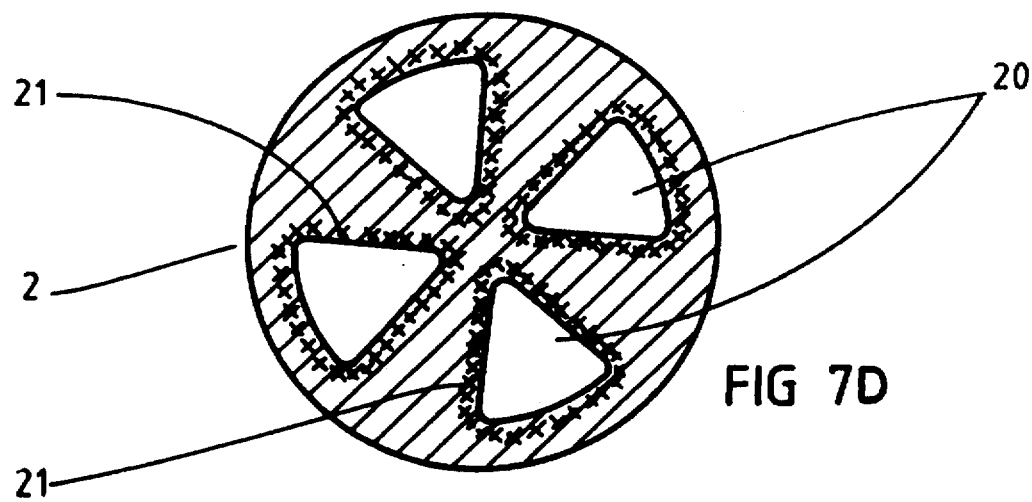
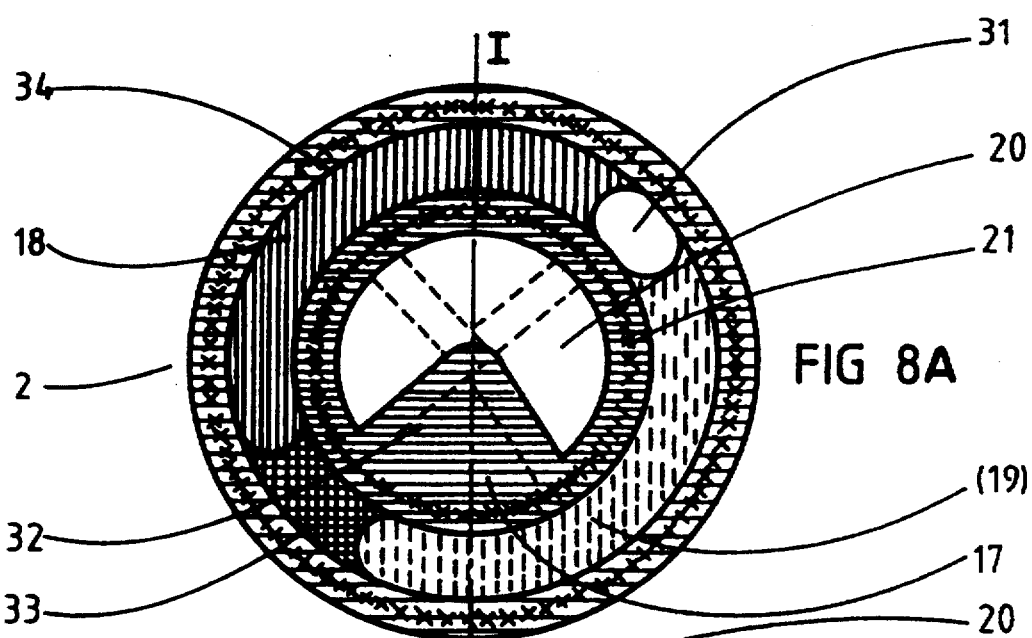
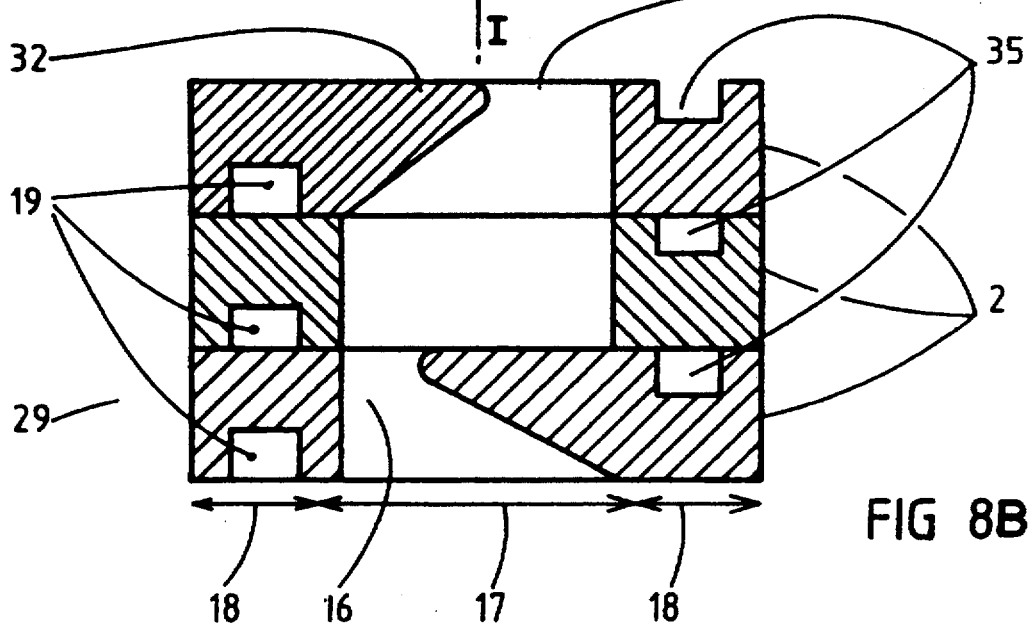

TRICKLING FILM GAS-LIQUID CONTACTOR AND USE

TECHNICAL FIELD OF THE INVENTION

The invention relates to the field of heat exchangers, more particularly to that of trickling film gas-liquid contactors, which perform transfers of matter and heat between gas and liquid.

STATE OF THE ART

The Applicants have already perfected a heat exchange apparatus of the trickling film type, as described in EP-A1-0 429 375.

In its basic version, this apparatus comprises a tube in which a heat transfer liquid circulates and which is provided on the outside with a helical fin which in the form of a thin film conducts the flow of liquid to be treated, the fin and the tube being in thermal contact and being themselves of a material which is a good conductor of heat. This apparatus is intended to carry out transfers of matter (absorption, evaporation, desorption . . . ) between the liquid to be treated and the gas/vapour surmounting said liquid.

Such an apparatus is typically obtained by machining a block of graphite or metal in such a way as to obtain an excellent exchange of heat between the central tube conveying the heat exchanging medium and the fin conveying the liquid to be treated.

PROBLEM POSED

The Applicants have pursued their investigations in the field of evaporator-absorber devices (also called gas-liquid contactors) for two reasons essentially:

- on the one hand in order further to improve the heat transfer coefficient between the liquid to be treated and the heat-bearing (or coolant) fluid, in order to enhance the efficiency of processing and/or in order to reduce the size of the apparatus or devices in question (the continual endeavour to achieve miniaturisation),
- on the other, in order to reduce manufacturing costs, particularly the costs of materials, the production method involving machining from a block of material being a particularly major consumer of material.

GENERAL DESCRIPTION OF THE INVENTION

According to the invention the trickling film gas-liquid contactor for transferring matter and heat between gas and liquid comprises a helical support of heat conductive material permitting a liquid to be treated (evaporation or absorption) to flow by force of gravity in the form of a trickling film, a wall of heat conductive material and in thermal contact with the said support, separating in sealing-tight fashion the said liquid and a heat exchanging fluid, and is characterised in that the said helical support of the said liquid and the said wall are formed by a vertical stack of open work plates of heat conductive material, offset angularly in respect of one another by an angle Phi by rotation about the axis of the said helical support, each plate thus forming an element of the said support, like a step on a spiral staircase, and an element of the said wall, by means ensuring the rigid and sealing-tight assembly of the said plates in such a way as to obtain an evaporator or an absorber which is economical and efficient by virtue of the said support favouring the mixing of the said liquid and increasing the transfer of heat between the said liquid and the heat exchanging fluid.

It is important to note that the apparatus according to the invention, as in the case of a monobloc evaporator of the prior art, retains the continuity of the material in contact with the liquid to be treated and the heat exchanging fluid (the aim being simplification, "heat exchanging fluid", in this application denotes a fluid carrying heating or cooling energy).

Indeed, each plate forms at once an element supporting the flow of the liquid to be treated and a wall element separating the heat exchanging fluid from the liquid to be treated. Therefore, as in the aforesaid prior art, the present invention ensures a continuity of material (by horizontal slice), and therefore optimum heat transfer at the heart of the conductive material which carries out the exchange of heat.

The term "plate" is intended to refer to objects of which one dimension, the thickness, is less than the other dimensions. The plates according to the invention are therefore rather more "two dimensional" objects, a stack of which produces the final "three dimensional" apparatus.

Thus, whereas the monobloc apparatus of the prior art called for starting with a large block of material, like a sculptor cutting marble, and necessarily resulted considerable loss of (waste) material, the apparatus according to the present invention is obtained from plates of relatively minor thickness obtained typically by slicing through an ad hoc profiled member obtained by drawing, or by stamping a strip or sheet material. Cutting produces minimal losses. By stamping, optimum cutting of the plates results in a loss of material which is markedly less (up to three times less) than that obtained with the apparatus according to the prior art.

Furthermore, surprisingly, the heat transfer coefficient h between the trickling film and its carrier (plate) in the apparatus according to the invention has been found to be improved in comparison with the prior art.

Upon analysis, it has become apparent and subsequent tests have confirmed it, that the particular way the liquid to be treated flows constituted the main explanatory factor.

According to the hypothesis advanced by the Applicants to explain these results, the flow of a trickling film over a support consisting of the steps of a spiral staircase is said to display a hydrodynamic behaviour entailing two regularly alternating patterns: alternation of "piston" flow in the horizontal part of the staircase (referred to as the "tread") and the "perfect mixing" flow in the vertical part (referred to as the "riser"), as illustrated in FIGS. 1 and 2, which would be highly conducive to the attainment of a high h value.

For a given type of plate, it is possible to produce a wide variety of apparatuses simply by varying the angular offsets (or pitch) Phi, a generally constant angle between two successive plates corresponding to the part of the plate or tread which effectively serves as a carrier for the trickling film. It amounts to the same to mention the number n of plates per spiral, since n=360°/Phi°.

It has been noted that there is a range of the angle Phi which results in an optimum value of h. Everything seems to happen as if there had to be a certain balance between the proportion of "tread" (piston flow) and "riser" (perfect mixer).

With these plates of thickness Ep comprised between 0.5 and 20 mm and preferably comprised between 1 and 10 mm, as envisaged by the invention, the optimum range for the angle Phi has been found to be between 6° (60 plates per spiral) and 90° (4 plates per spiral) and preferably between 10° and 36° (from 10 to 36 plates per spiral).

Outside this range, the value of h diminishes considerably doubtless either because there is not sufficient mixture when Phi is greater than 90° C. (sic!) or because there is too much (torrent type flow) when Phi is less than 6°.

DESCRIPTION OF THE DRAWINGS

The plates are offset angularly in respect of one another by an angle Phi about a central axis (8) (axis of the helix), not shown.

FIG. 3a represents a plate (2) comprising an annular portion (9) of inner radius Ri and outer radius Re (width Eb=Re−Ri), and an inner fin (10) in the form of a portion of a collar (segment of angle A), with an inner radius Rt and outer radius Ri.

The annular part (9) carries a circular groove (21) (indicated by crosses x) intended to accommodate a sealing gasket. It is important to note that the sealing-tight grooves in this drawing and the subsequent drawings are optional because there are many ways of ensuring sealing-tightness between plates which do not require grooves.

Figure 1:
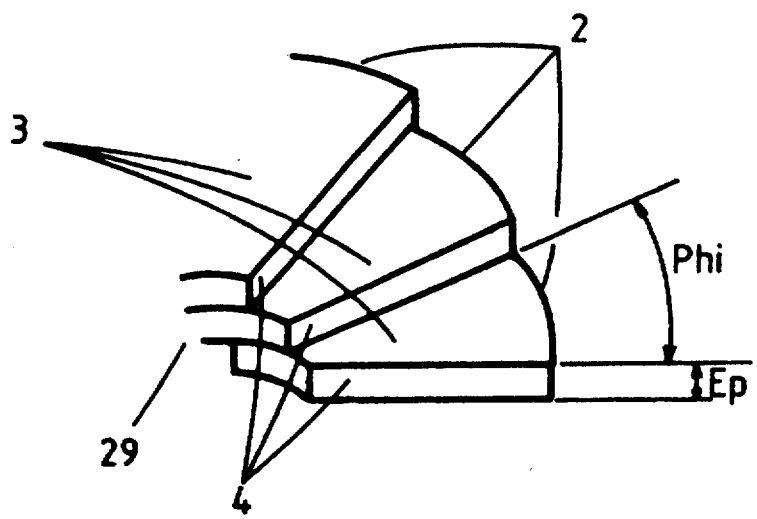
FIG. 1 shows in perspective a stack (29) of three plates (2) forming a spiral staircase shaped carrier, each plate having a horizontal surface (3) referred to as the "tread" and a vertical surface (4) referred to as the "riser".
Figure 2:
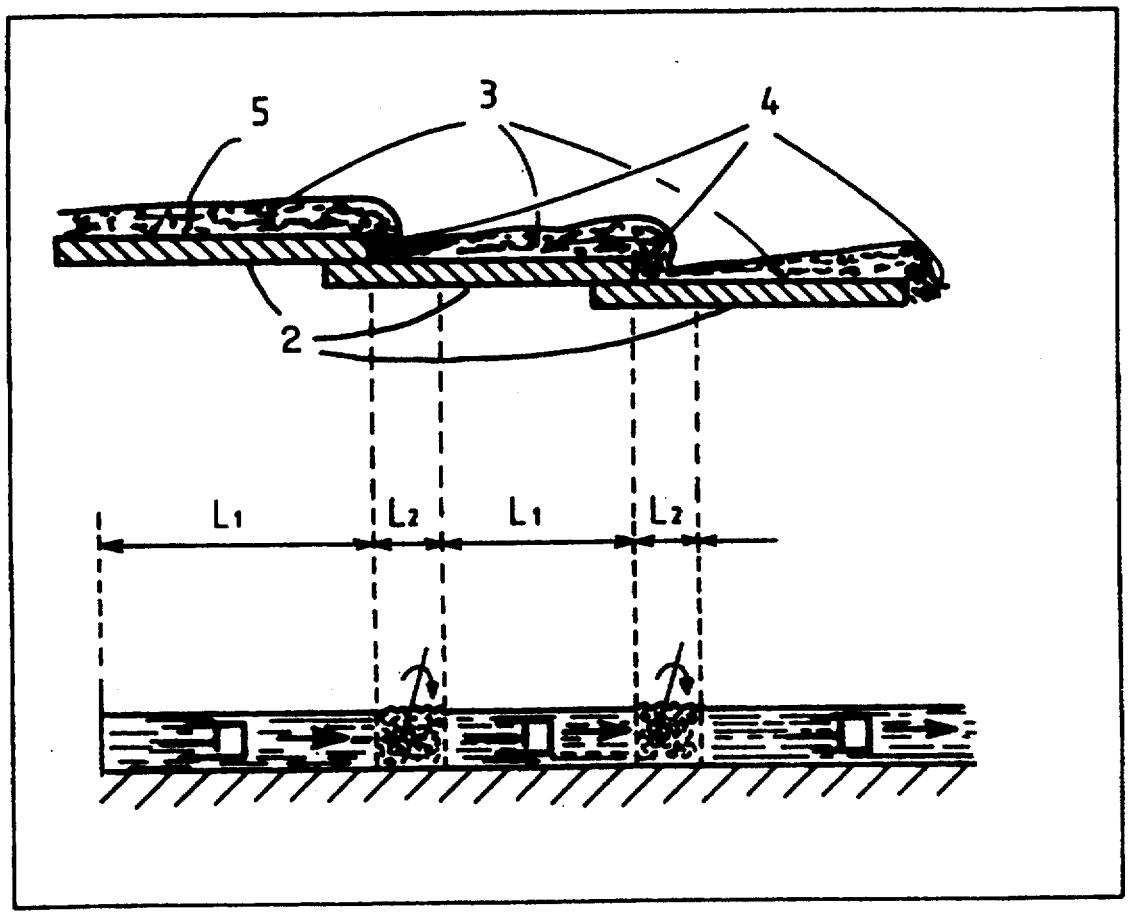
FIG. 2 is a diagrammatic cross-section showing a flow of a trickling film (5) over a stack of plates (2) and the succession of corresponding hydrodynamic patterns: a so-called "piston" flow (symbolised by a piston) when the trickling film is flowing over the tread (3) and at a distance from the riser (4), that is to say without any significant mixing of the streams of liquid (over a length L1), so-called "perfect mixer" flow (shown symbolically by a turbine) when the trickling film crosses the riser (4) (over a length L2).
Figure 3A:
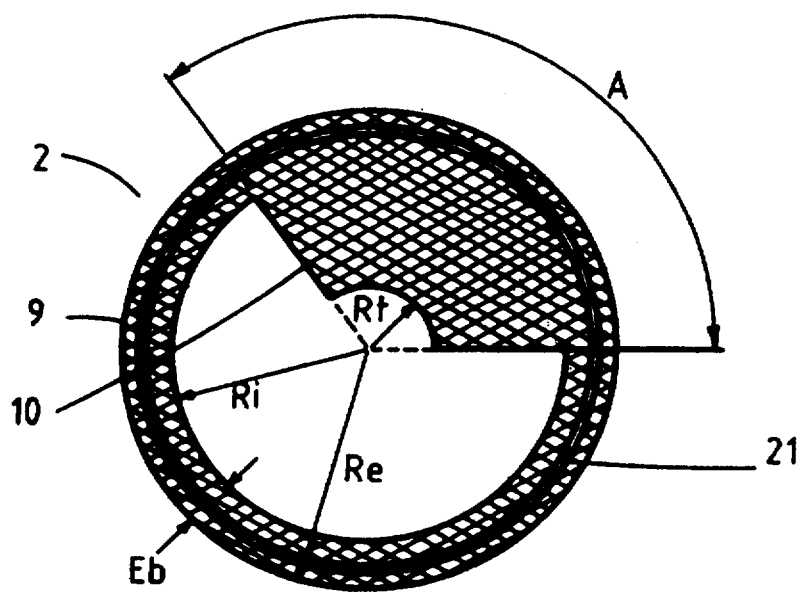
FIGS. 3a to 3c represent plan views of plates (2) according to a first embodiment of the invention.
Figure 3B:
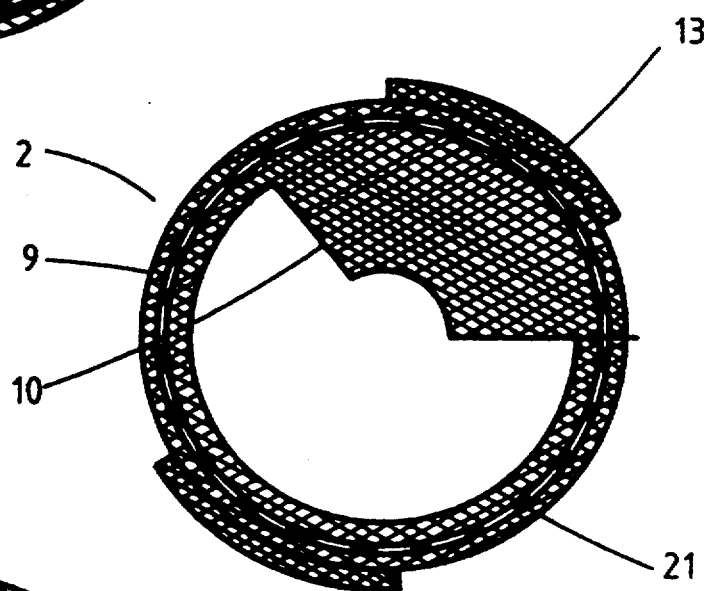

FIG. 3b shows a plate (2) similar to that in FIG. 3a except that it contains in addition two outer fins (13) intended to facilitate centring of the plates in an outer cylindrical casing (not shown), and to ensure a helical flow of the heat exchanging fluid circulating between the said casing and the wall of the gas-liquid contactor.

Figure 3C:
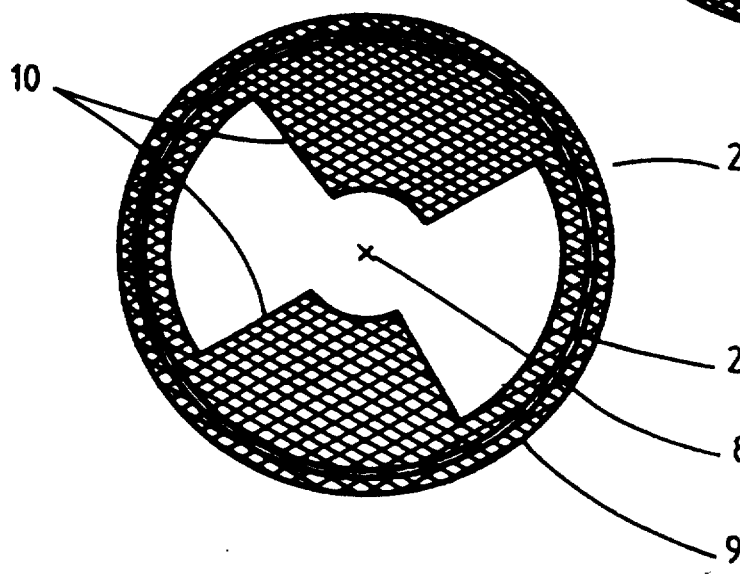

FIG. 3c shows a plate (2) similar to that in FIG. 3a except that it contains two inner fins (10) symmetrical in relation to the central axis (8) at right-angles to the plate (2).

Figure 4A:
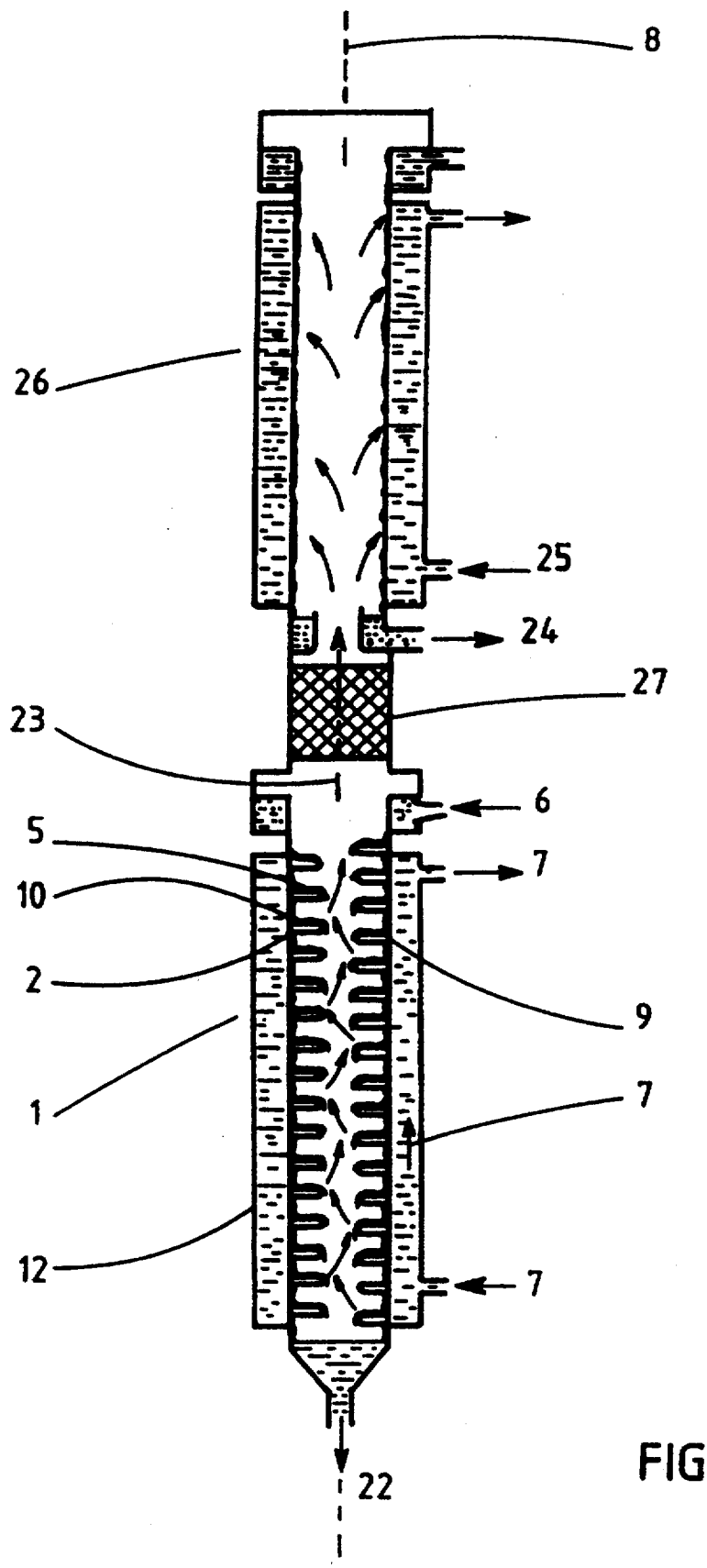
Figure 4B:
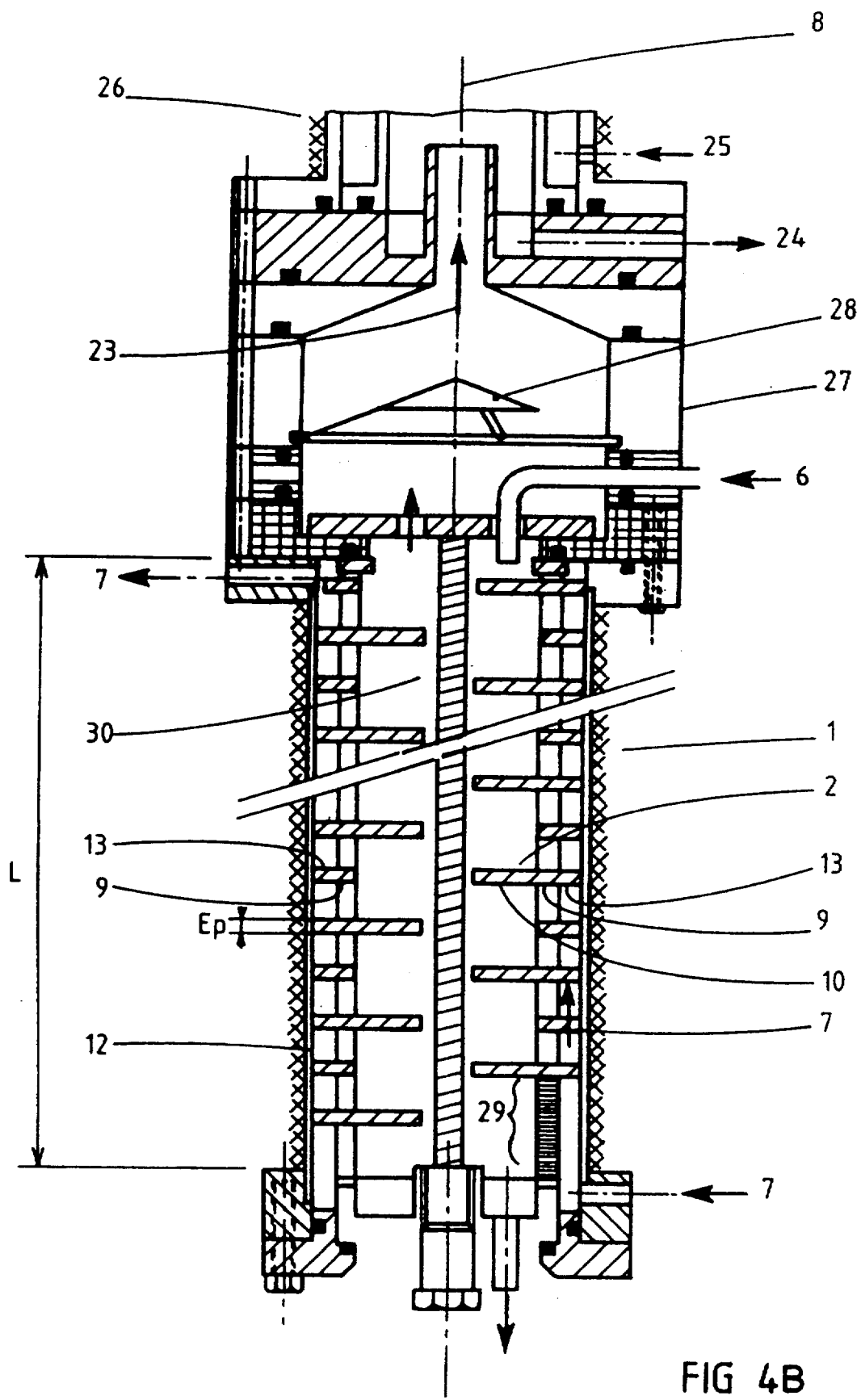

FIGS. 4a and 4b represent in section on the vertical axis (8) apparatuses comprising a gas-liquid contactor (1). FIG. 4a is a diagram showing the principle of an evaporation-condensation means comprising a gas-liquid contactor (1) according to the first embodiment of the invention, consisting of a stack of plates (2), each comprising an annular part (9) constituting the wall of a tube and an inner fin (10). The gas-liquid contactor (1) is supplied with liquid (6) to be evaporated in its central part and with heat exchanging fluid (7) in the peripheral part (in the double wall formed by an outer jacket (12) and the tube constituted by the stack of annular parts (9)). It is surmounted by a deoxidising chamber (27) and a condenser (26) cooled by a refrigerant (25) which condenses the vapour (23) emanating from the gas-liquid contactor (1) into liquid (24). The liquid (22) is recovered at the base of the contactor.

FIG. 4b represents an apparatus according to the first embodiment of the invention, described in Example 1. The drawing is on a scale of 1:2 (1 cm represents 2 cm), with L=500 mm. For clarity of the drawings, firstly only the plates (2) are shown which indicate the pitch of the spiral (spiral staircase) and secondly these plates (2) are shown thicker than they are in reality (true thickness=4 mm). The stack of plates (29) illustrates the thickness of the plates (2) to the scale of the drawings. It should be noted that the plates (2) are constituted by an annular part (9) carrying on the inside a fin (10) and externally two fins (13) to facilitate assembly and centring of the plates in the tube (12) forming an outer jacket (in the drawings, the crosses X represent the heatproofing of the tube (12)) and intended to impose a helical movement on the heat exchanging fluid (7).

The damping chamber (27) is shown in detail in FIG. 4b and is equipped with the anti-priming barrier (28) intended to prevent liquid (6) being entrained towards the condenser by the vapour (23). In this type of apparatus, the sealing-tight compression of the plates (2) is ensured by the screw-threaded rod (30).

FIGS. 5a to 5e illustrate the second embodiment of the invention.

Figure 5A:
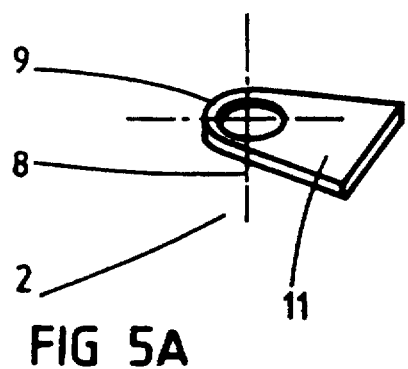

FIG. 5a is a perspective view of a plate (2) comprising an annular part (9) centred on the perpendicular axis (8) and a fin (11) outside this annular part.

Figure 5B:
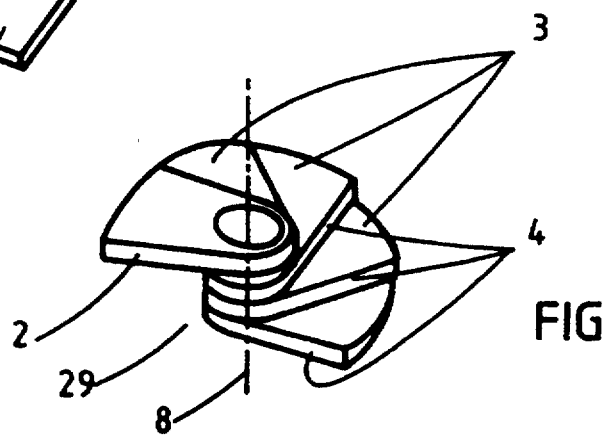

FIG. 5b diagrammatically shows in a perspective view a stack (29) of four plates according to the second embodiment: the result is the formation of a central tube (stack of annular parts) intended for circulation of the heat exchanging fluid and a staircase formation consisting of horizontal parts or treads (3) and vertical parts or risers (4) intended to provide for flow of the trickling film.

Figure 5C:
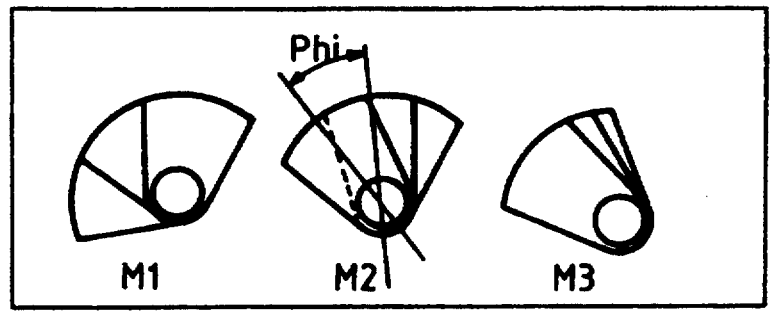

FIG. 5c is a plan view of a stack of three plates showing that by a variation of the angle Phi (angular offset between two successive plates), more or less rigid staircase formations result (contactors M1, M2 and M3 in Example 2).

Figure 5D:
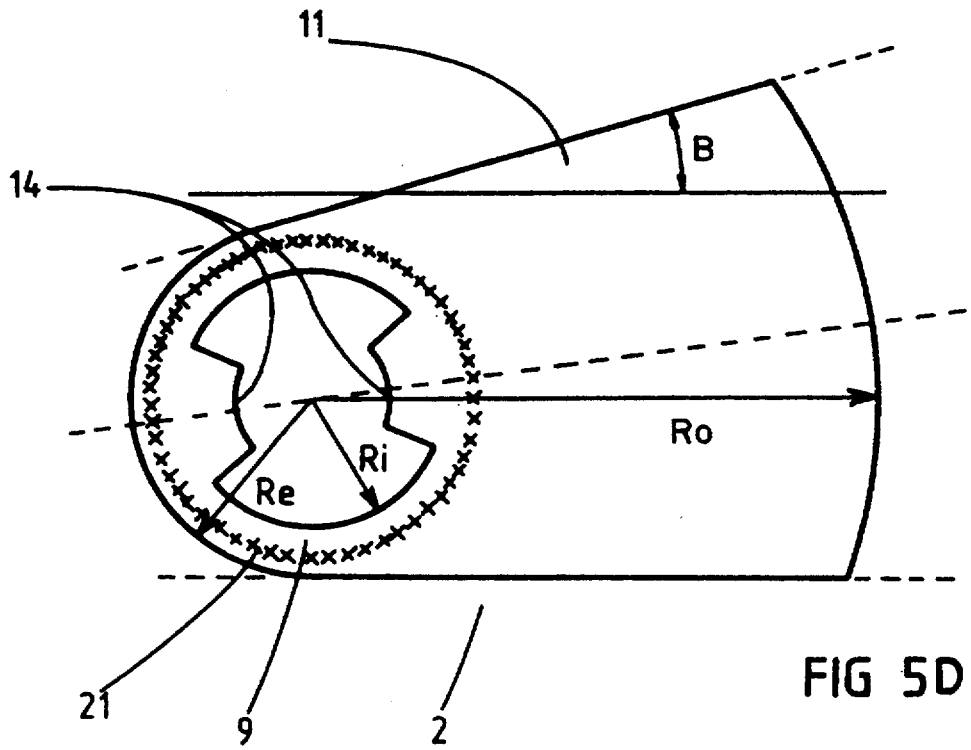

FIG. 5d is a plan view of a plate (2) comprising a fin (11) and an annular part (9) in which a sealing-tight groove (21) is shown and which contains on the inside two fins (14) intended to facilitate assembly and centring of the plates and to ensure helical circulation of the heat exchanging fluid.

Figure 5E:
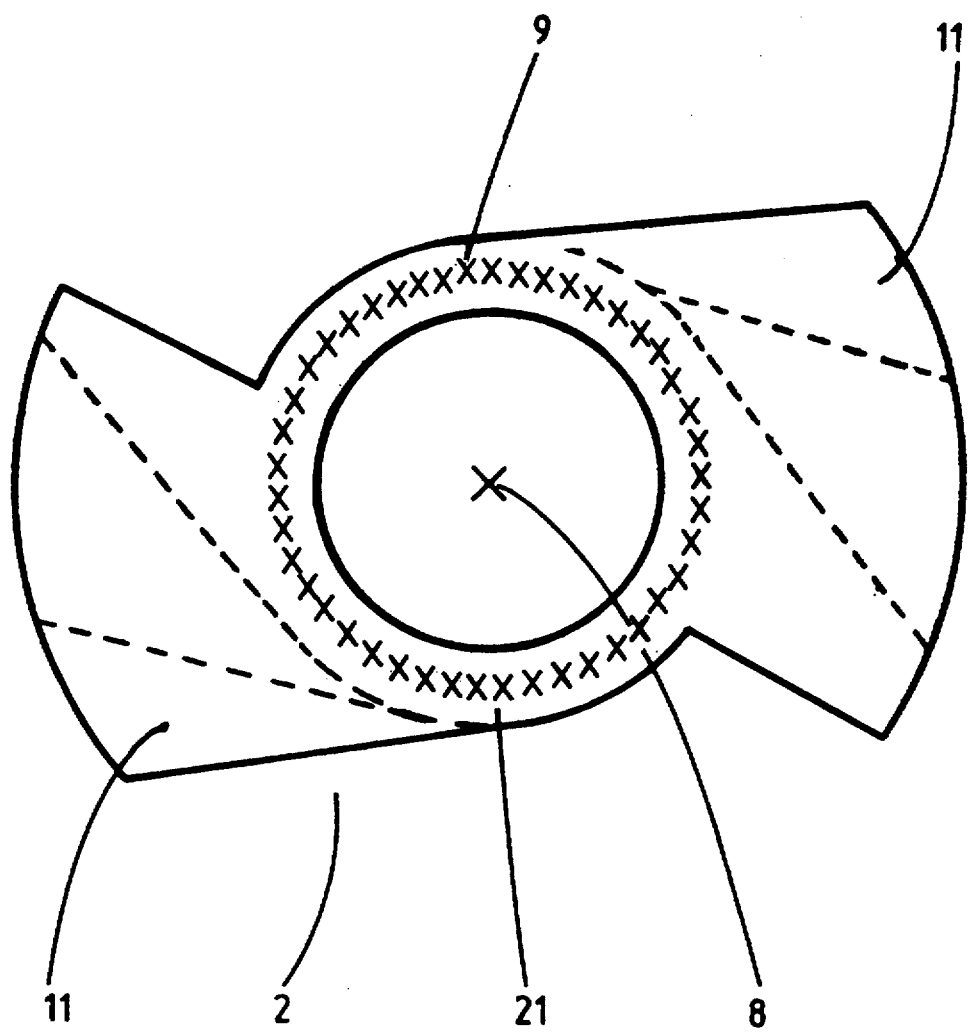

FIG. 5e is a plan view of a plate (2) comprising two fins (11) symmetrical in relation to the axis (8) in order to form a double helix stack (29).

Figure 6:
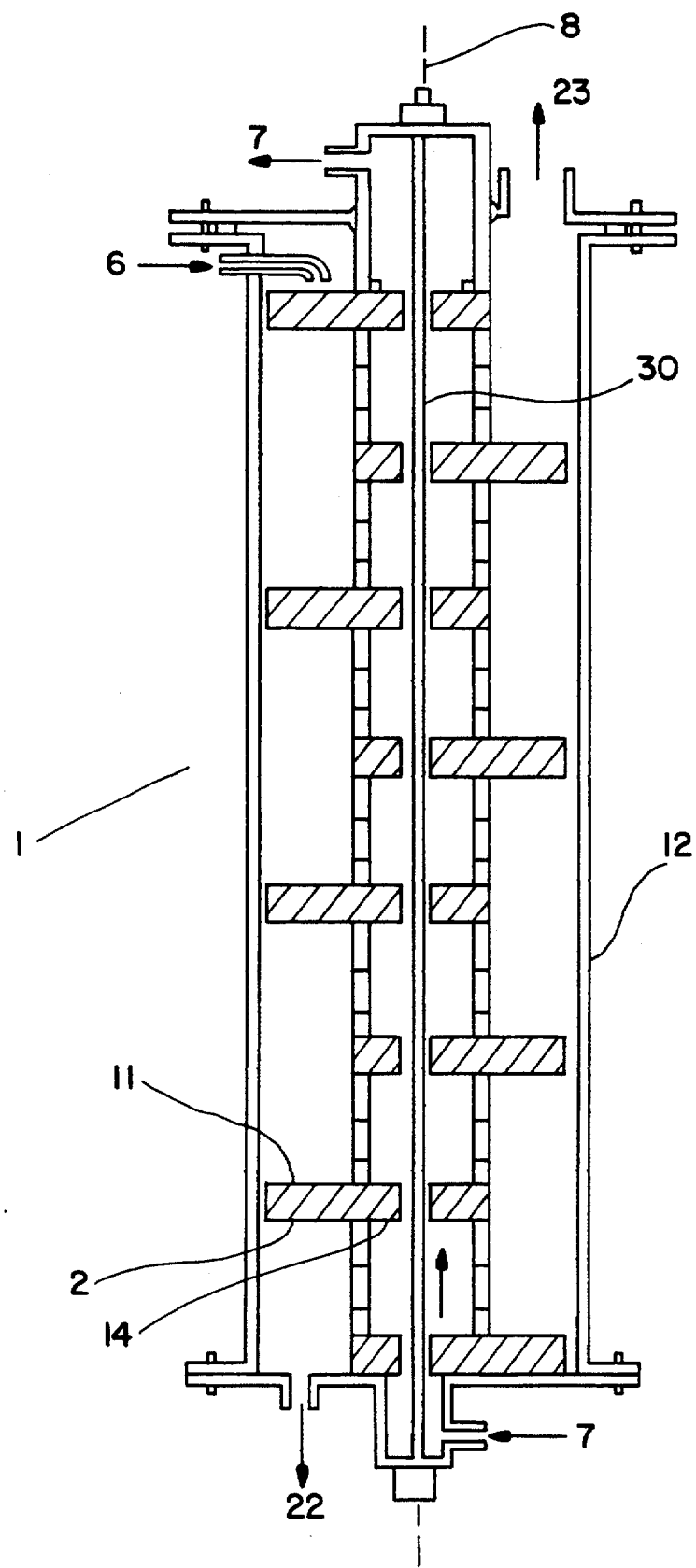

FIG. 6 shows in section according to the axis (8) a gas-liquid contactor (1) according to the second embodiment of the invention, obtained by stacking plates shown in FIG. 5d. Only the plates indicating the pitch of the helical spiral are shown. In this apparatus, the sealing-tight compression of the plates is achieved by exerting traction on a central rod (30) at the screw threaded ends. The references common to FIGS. 6 and 4a to 4b having the same significance are not used here.

FIGS. 7a to 7d, 8a to 8b and 9a to 9b illustrate a third embodiment of the invention in which the plate (2) consists of an open work thin cylindrical plate having at least two different orifices.

Figure 7A:
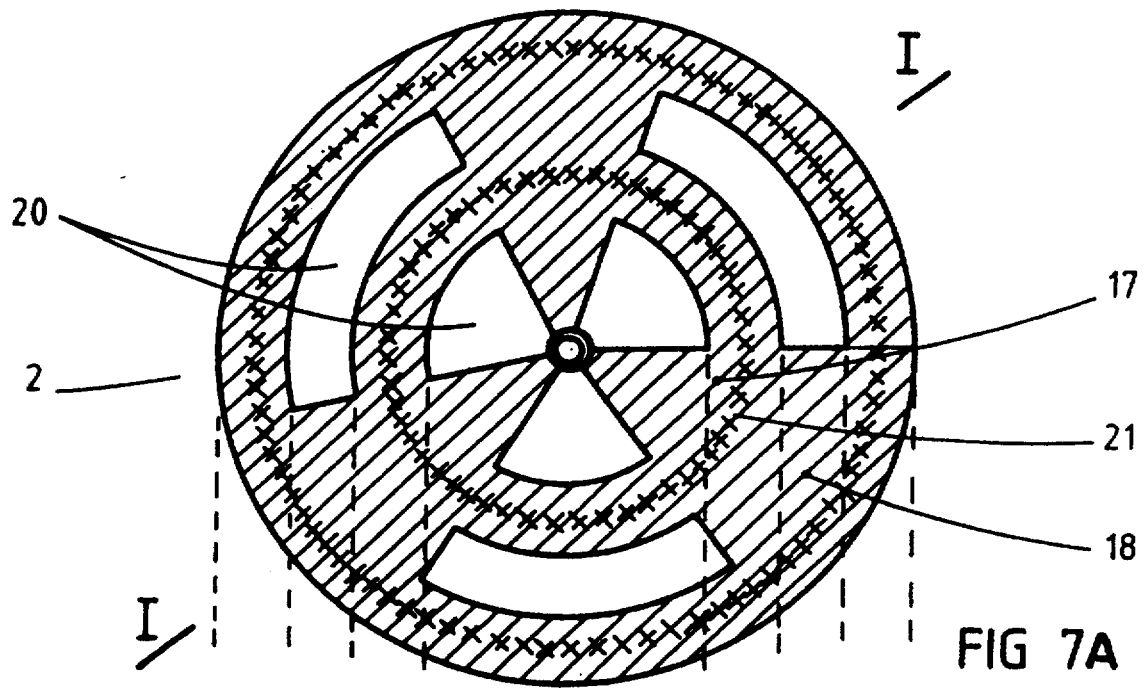

FIG. 7a is a plan view of a plate illustrating a first alternative embodiment with orifices (20) shaped like portions of rings, the plate being divided into two parts separated by a sealing-tight cylindrical zone. The sealing-tightness of this zone and that of the outer zone are possibly achieved, as shown in FIG. 7a, by circular grooves (21) containing a ring seal of flexible material. An inner circular part (17) contains orifices (20) intended for example for the circulation of heat exchanging fluid, the other outer annular part (18) containing the same number of orifices, facing the aforementioned, intended for the flow of trickling film. The reverse may also apply: the heat exchanging fluid on the outside and the trickling film on the inside. In this drawing, but this is only an option, the plate comprises a central orifice allowing passage of a rod (30) with screw threaded ends intended to ensure the sealing-tight compression of the plates.

Figure 7B:
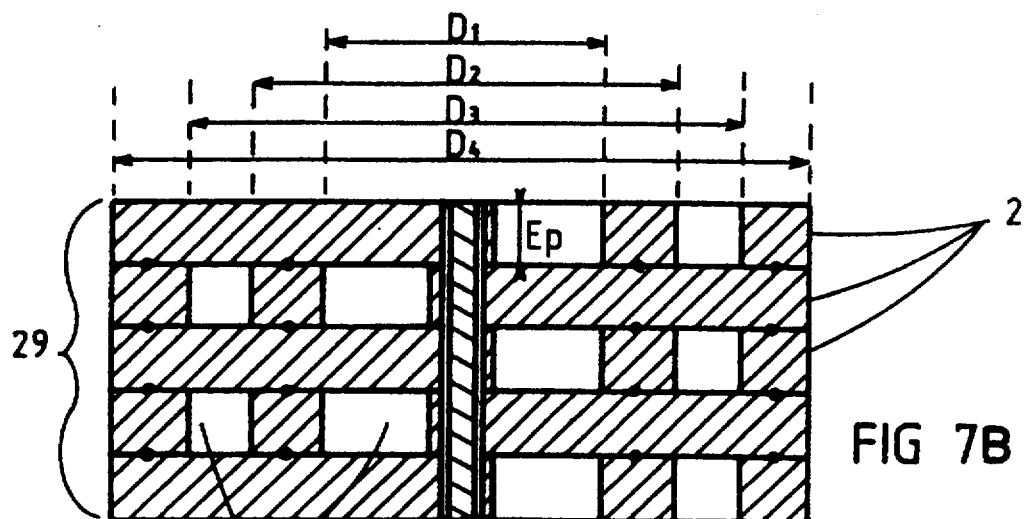

FIG. 7b is a cross-sectional view of a stack (29) of five plates (2) showing the formation of passages (16) by angular offset of the plates (Phi=60°). The upper plate is a section of the plate in FIG. 7a taken on the axis I—I.

Figure 7C:
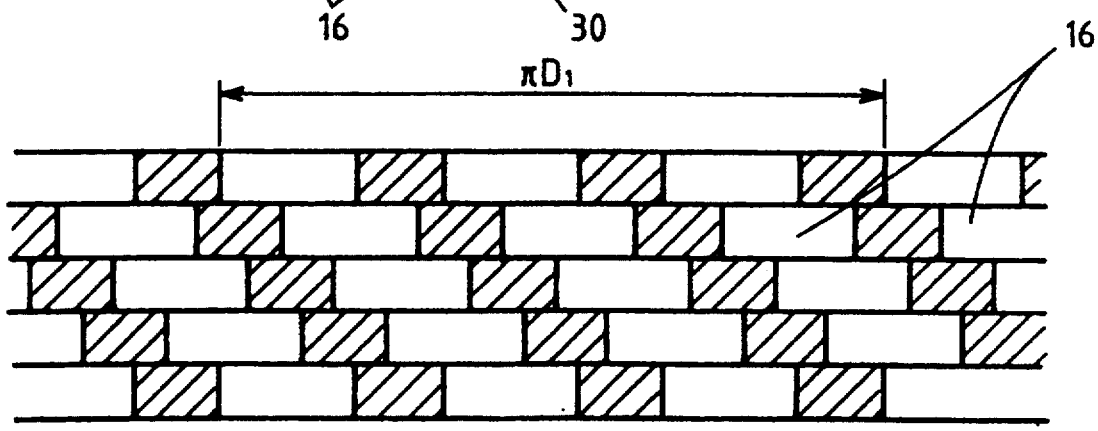

FIG. 7c is a developed view of the stack in FIG. 7b for the diameter D1 and shows the passages (16) in a staircase formation.

FIG. 7d which illustrates a second alternative, is a plan view of a plate (2) divided into quarters, each quarter having an orifice (20), one and the same fluid or liquid circulating in two opposite orifices in order to obtain good heat exchange. Sealing-tightness between orifices and in respect of the outside is represented by sealing-tight grooves (21) which constitute only one of many sealing-tight means.

FIGS. 8a and 8b illustrate a third embodiment. FIG. 8a is a plan view of a plate (2) having two concentric parts separated by a circular sealing-tight zone represented by the sealing-tight groove (21): an inner part (17) comprising a fin (32) of radial vertical cross-section of trapezoidal shape, an outer annular part (18) outside the upper part of the plate, comprising an annular groove (34) in the upper part of the plate, an annular groove (19) in the lower part of the plate (shown but not visible from above) and an orifice (31) providing communication between the two grooves (19) and (35). In this drawing, these grooves describe an arc of a circle of approx. 160°. The double-shaded part (33) corresponds to an annular portion with no either upper or lower annular groove.

FIG. 8b is a cross-section through a stack (29) of three plates according to FIG. 8a with an angular offset Phi of 90°. The upper plate corresponds to a cross-section of the plate in FIG. 8a, taken on the axis I—I.

Figure 9A:
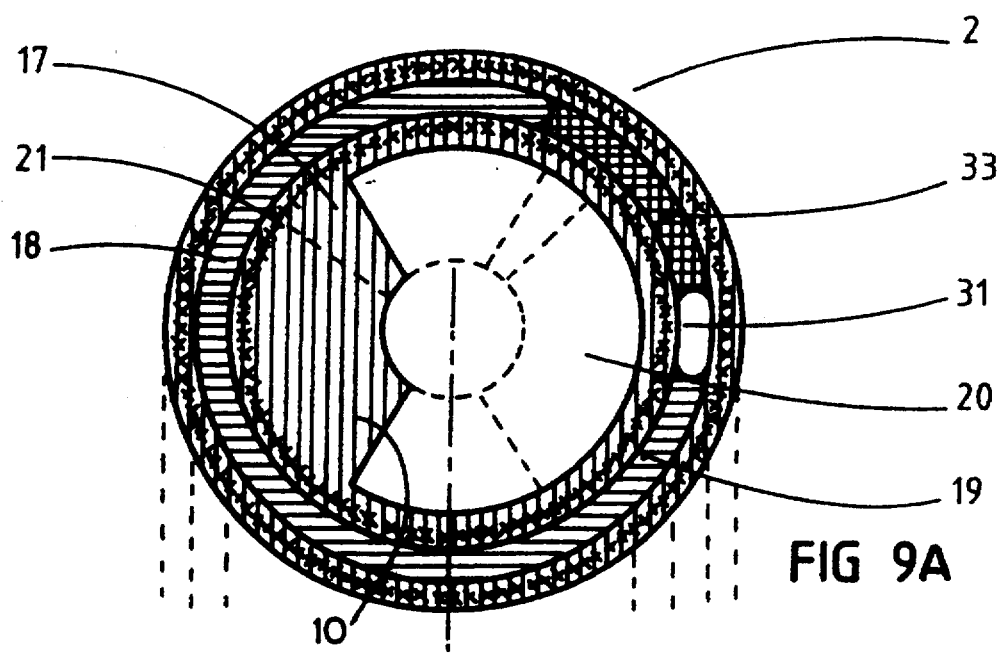
Figure 9B:
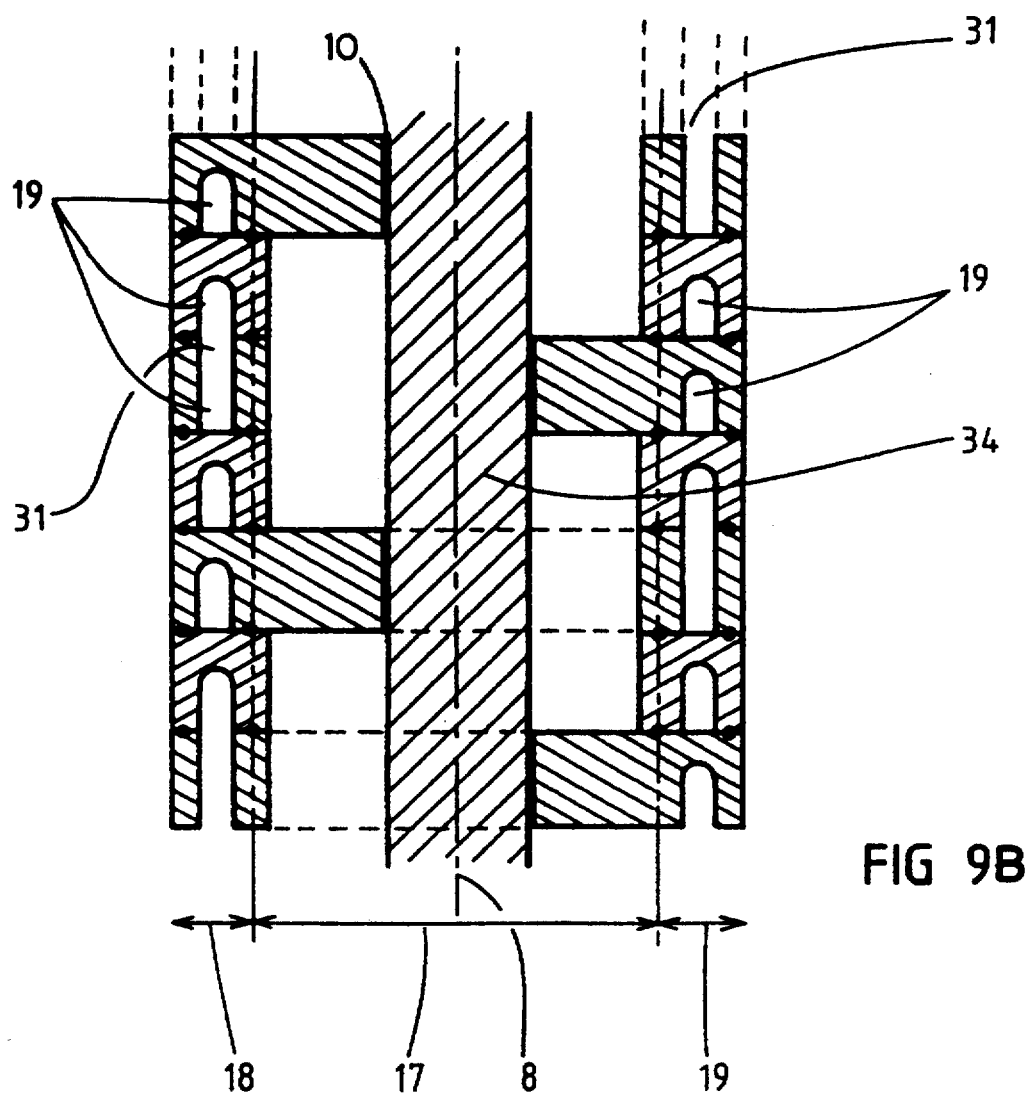

FIGS. 9a and 9b are similar to FIGS. 8a and 8b. They differ in that there is no upper groove (34) such as there is in FIGS. 8a and 8b, in that the inner fin in FIGS. 9a and 9b is a fin (10) of the same thickness as the thickness of the plate and in that the inner end of the fin is in the form of an arc of a circle in order to obtain, thanks to a central core (34), an easy assembly of the plates and an opportunity of carrying out heat exchanges in counter-current (gas or steam circulating in a spiral from the bottom to the top in counter-current to the trickling film), necessary in certain applications, particularly in gas-liquid absorption.

As in FIGS. 8a and 8b, the annular groove (19) does not run over the entire circumference, a portion the circumference (33) being solid in order to force the heat exchanging fluid to circulate in the groove (19).

Figure 10A:
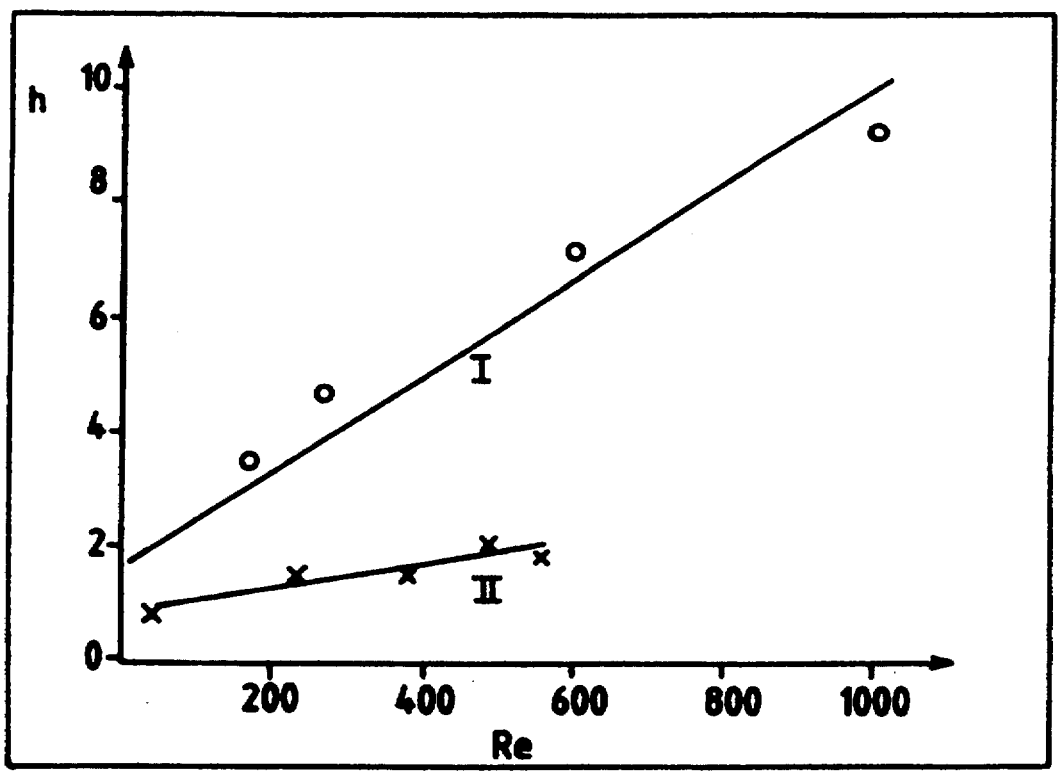
Figure 10B:
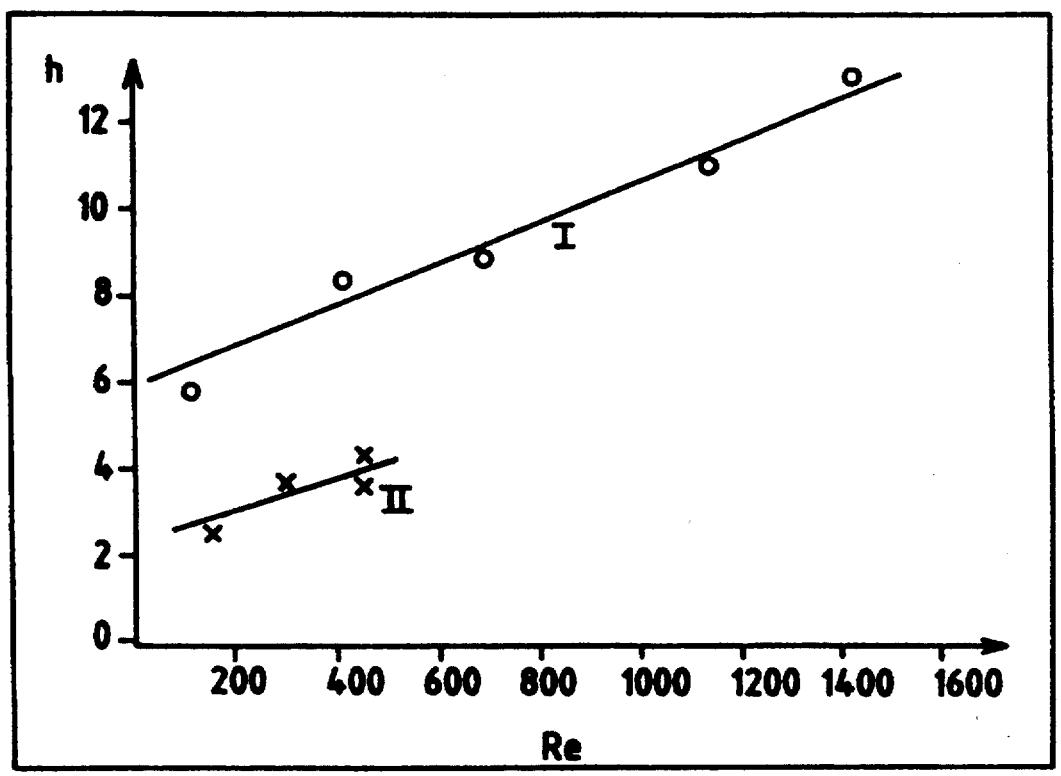

FIGS. 10a and 10b are graphs showing the coefficient h of heat transfer between trickling film and fin (h in the ordinates in $kW.m^{-2}.°K.^{-1}$ as a function of the Reynolds number of the trickling film (Re on the abscissa) of the brass gas-liquid contactor shown in Example 1. FIG. 10a relates to the heating of the trickling film and FIG. 10b to the desorption of the film (separation of a volatile phase). The graphs I (o) relate to the gas-liquid contactor according to the invention, the graphs II (x) relating to a smooth tube of the same material (brass).

Figure 11A:
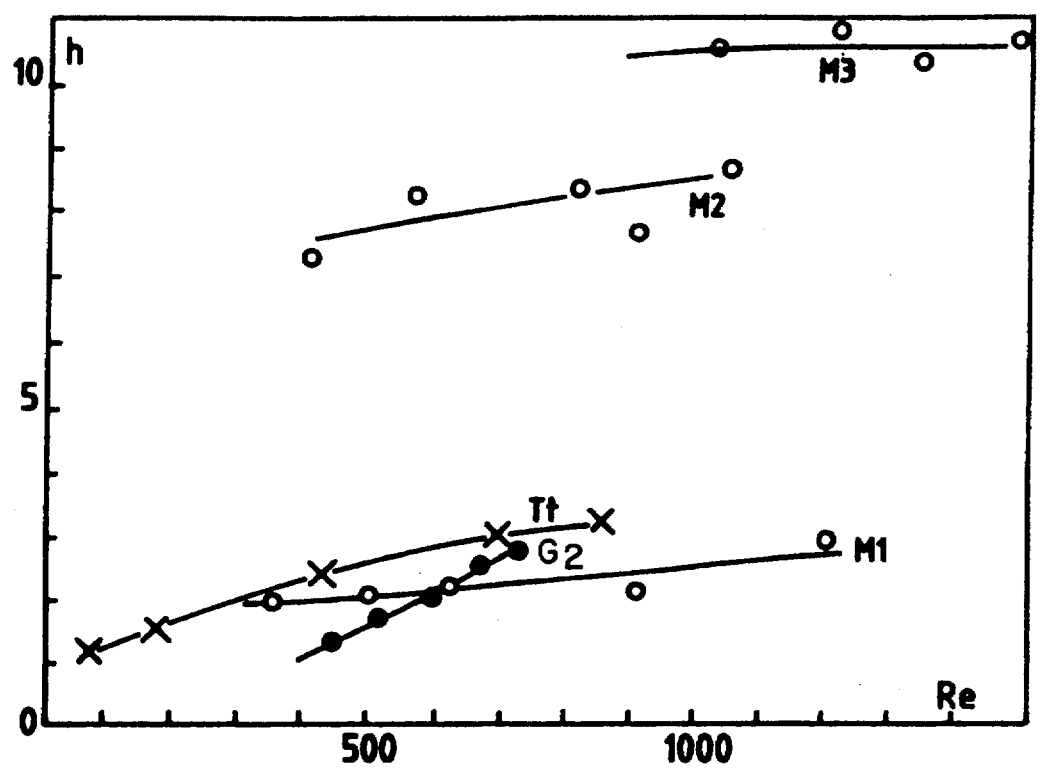
Figure 11B:
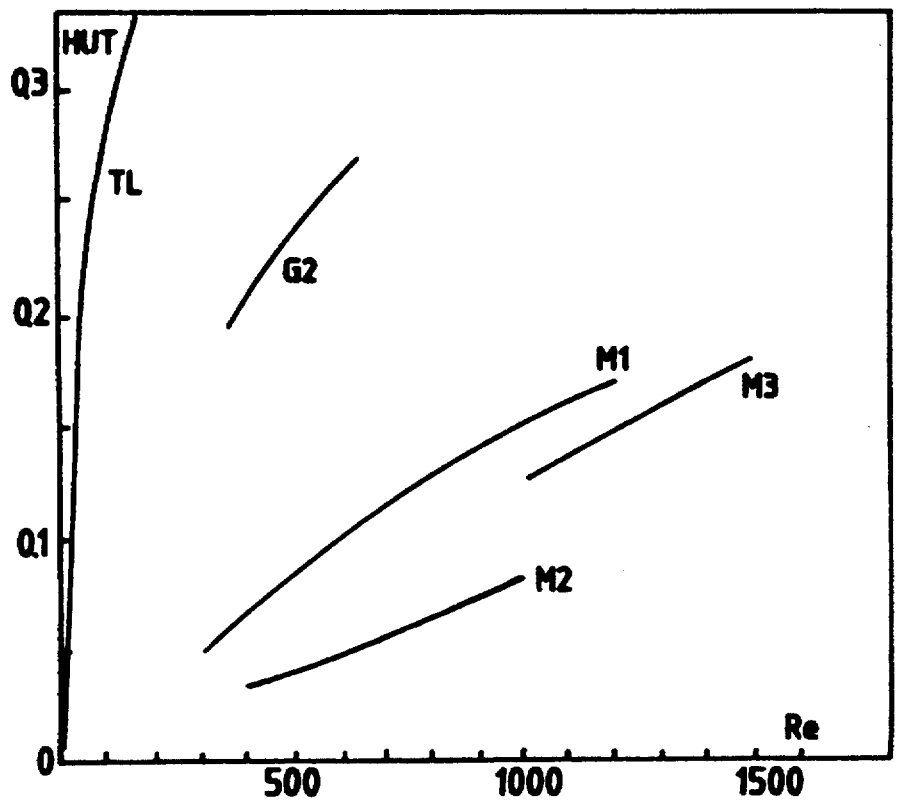

FIGS. 11a and 11b are graphs relating to the gas-liquid contactors (M1-M2-M3) of copper and relating to Example 2 and concerning the heating of the trickling film.

FIG. 11a is equivalent to FIG. 10a (h on the ordinate in $kW\ m^{-2}.°K.^{-1}$ Re on the abscissa), whereas FIG. 11b shows the HUT on the abscissa (in meters) as a function of the Reynolds number Re.

The HUT (height of transfer unit) is a magnitude which is inversely proportional to the product h.A in which h denotes the fin-trickling film heat transfer coefficient while A designates the area of the wall supporting the trickling film. The HUT makes it possible to compare the apparatuses and to a certain extent translates the height of the apparatus for equal performances: the smaller the HUT, the better the apparatus is performing (heat exchange capacity per unit of volume).

In FIGS. 11a and 11b, the graphs noted M1, M2, M3 (o) correspond to the gas-liquid contactors according to the invention and the graphs noted TL (x), G2 (°) correspond to prior art gas-liquid contactors (TL is a smooth copper tube, G2 is a helical exchanger of graphite according to the aforesaid prior art (see Example 2).

DETAILED DESCRIPTION OF THE INVENTION

Although it is not vital to the implementation of the invention, it is convenient and economical to have a contactor consisting of a stack of open work plates (2) which are plane and identical to one another.

Indeed, the cost of a gas-liquid contactor is to a great extent linked to the cost of producing plates (2). Economic plates (identical and substantially plane) are obtained by two processes:

either by stamping, cutting of thin starting strip material of thickness Ep (Ep denoting the thickness of the plate to be obtained), a stamping operation likewise possibly forming at the same time a groove of slight depth (in relation to Ep) on the surface of the plate, a groove which may contribute to ensuring sealing-tightness between plates, as will be seen hereinafter, or by cutting of lengths from a profile section obtained by drawing. In this case, there is no loss of material in contrast to the former case where there is always a "skeleton" of strip after stamping, except with plates which form a continuous strip.

According to a first embodiment of the invention, the gas-liquid contactor is formed by plates (2) comprising an annular part (9) forming an element of the said wall and provided on the inside with at least one inner fin (10) forming an element of the said support in order to obtain, by stacking of the said plates, a tube inside which the said liquid (6) flows and the outer surface of which is in contact with the said heat exchanging fluid (7) as shown in FIGS. 3a to 3c, 4a and 4b.

These plates have a ratio Re:Ep comprised between 4 and 20 and preferably between 6 and 10, Re being the outside radius of the said annular part while Ep is the thickness of the said plate, this in order to integrate both the notions of similitude, feasibility (ease of obtaining plates) and technical and economic efficiency which, as tests or calculations show, exclude excessively low or excessively high ratios of Re:Ep.

The annular part (9) constitutes a wall element subjected to mechanical stresses also the ratio Eb:Ep, Eb designating the width of the said annular part (difference between Re, outside radius, and Ri, inside radius) is comprised between 0.5 and 5 and preferably between 1 and 2.

Preferably, the said inner fin (10) takes the form of a portion of a ring or a segment, the angle A of the said segment or the sum of the angles of the said segments in the event of this plate comprising more than one segment (FIG. 3c) being comprises between 60° and 200° and preferably between 100° and 160°.

In order to ensure circulation of a heat exchanging fluid on the outer surface of the wall formed by the stack (29) of plates, the stack (29) is surrounded by an insulating cylindrical casing (12), the tube concentrically surrounding the said stack with a gap between the said wall and the said casing allowing circulation of the said heat exchanging fluid (7) between the said wall and the said casing.

In particular when the assembly of the plates does not employ a central rod (30), it is advantageous for the said annular part (9) to have on the outside at least two fins (13) which are symmetrical with the axis (8) of the said helical support in order to facilitate centring and mounting of the plates (2) inside the cylindrical casing (12) which is generally insulating or coated with an insulating layer, and facilitating helical circulation of the said heat exchanging fluid between the said tube and the said insulating casing, which is favourable in terms of heat exchange.

According to a second embodiment of the invention, the said plate (2) comprises an annular part (9) forming an element of the said wall and provided on the outside with at least one outer fin (11) forming an element of the said support so that by stacking the said plates a tube is obtained which has on its outer surface a helical support intended for the flow of the said liquid (6) and the inner surface of which is in contact with the said heat exchanging fluid (7).

FIGS. 5a to 5e and 6 correspond to this embodiment. As can be seen from FIGS. 5a to 5e, the said outer fin (11) takes the form of a segment bounded in the radial direction by two sides tangent to the said annular edge and making between them an angle B comprised between −30° and +90° and preferably comprised between 0° and 40°. For example, the fin in FIG. 5b has an angle B of 20°.

From a practical point of view, it is preferable for the said outer fin (11) to take the form of a segment bounded in the tangential direction by an arc of a circle of radius Rs, the centre of which is that of the annular part so that if necessary it is possible to use an outer cylindrical casing (12) which is possibly tangent with the outer edge of the outer fins (11).

For the reasons already stated on connection with the ratios Re:Ep and Eb:Ep (first embodiment), the ratio Rs:Ep must in the second embodiment be comprised between 3 and 30 and preferably between 5 and 20, according to whether the material used is averagely or highly conductive of heat, and the ratio Eb:Ep, Eb designating the width of the said annular part (difference between Re, outside radius, and Ri, inside radius) must be comprised between 0.2 and 3 and preferably between 0.5 and 2.

According to a particular version of this second embodiment, the said plate (2) comprises two outer fins (11) symmetrical in relation to the axis (8) of the said helical support, as illustrated by way of example in FIG. 5e.

FIG. 6 shows a gas-liquid contactor constructed in accordance with this second embodiment, with plates illustrated in FIG. 5d, of which the annular part (9) comprises on the inside two fins (14) (at least one is needed), in order to ensure helical flow of the heat exchanging fluid (7) and possibly an easy centring of the said plates (about the rod with the screwed end (30) in the case of FIG. 6).

According to a third embodiment of the invention, the said plate (2) consists of an open work cylindrical plate provided with at least two different orifices (20, 31) in order, when the said plates are stacked, to obtain a cylinder provided on the inside with at least two helical passages (16) allowing the parallel flow of the said liquid (6) and of the said heat exchanging fluid (7). This third embodiment has numerous alternative forms, four of which are described by way of illustration.

According to a first and a second alternative embodiment illustrated diagrammatically by FIGS. 7a to 7c and 7d, the said orifices (20) take the form of portions of rings or segments which in the radial direction are bounded by two segments of concurrent straight lines following the axis of the said helical support and in the tangential direction by two arcs of a circle. The said plate comprises 2.n distinct orifices with an axial symmetry of the order n in respect of the axis of the said helical support (superimposition by rotation of 360°/n), n orifices being intended for the flow of the said liquid and n orifices being intended for the flow of the said heat exchanging fluid with n greater than 1 and preferably equal to 2 or to 3.

The first alternative is shown diagrammatically by FIG. 7a: the n orifices (20) (n=3) intended for the flow of the said liquid (6) are situated on the outer annular part (18) of the plate (2) while the n (n=3 orifices (20) intended for the flow of the said heat exchanging fluid (7) are situated on the inner circular part (17) of the said plate. Between these two parts (17) and (18) is a circular sealing-tight zone. The sealing-tightness between inner and outer orifices and between surrounding atmosphere and orifices is ensured by any known means, possibly by circular grooves (21).

The second alternative embodiment is shown diagrammatically in FIG. 7d: the orifices (20) form a succession of hollow segments (2.n with n=2) separated by solid segments intended to ensure sealing-tightness between orifices. In FIG. 7d, the segments are of unequal size: the two "small" opposite segments are intended for the circulation of heat exchanging fluid (7), the two "large" segments are intended for the flow of liquid to be treated (6).

The sealing-tightness of each segment is possibly achieved by reason of a groove surrounding each segment and containing an O-ring seal of elastic material (rubber).

According to a third and fourth embodiment illustration in FIGS. 8a and 8b and 9a, 9b, the said plate (2) comprises two concentric annular parts separated by a sealing-tight annular zone, one (17) on the inside carrying a fin (10, 32) intended for the flow of the said liquid (6), the other (18) on the outside, provided with an orifice (31) in the upper part of the plate opening out onto a circular groove (19) situated in the bottom part of the plate to allow the circulation of the said heat exchanging fluid (7) over all or part of the circumference of the outer annular part (18). It is also possible to have a groove (34) on the upper part of the annular zone (18). These grooves (19) and (34) are intended to force the heat exchanging fluid to circulate along the entire horizontal path of the grooves (19) and (34) of a given plate (2) before passing to the following plate.

According to the third alternative embodiment, the said fin may have a vertical radial section of trapezoidal shape in order to encourage the flow of the said liquid over the under side of the said fin by spill-over of the said liquid.

According to the fourth alternative embodiment, the said fin has one end as an arc of a circle and a contactor comprises an axial cylindrical core (34) so as to form a helical passage with no direct vertical communication.

In some cases, it is possible to combine these various alternatives.

Whatever may be the embodiments or alternative forms of the invention, the plates (2) are of a heat conductive material chosen from the metals or metallic alloys, and graphite. Preferably, the heat conductive material chosen will be copper and copper alloys, aluminium and aluminium alloys or stainless steel when a high resistance to corrosion is desired.

Gas-liquid contactors with a height of stack (29) of between 200 and 2000 mm may be obtained according to the invention.

As it is generally desirable or essential for the said liquid (6) and the said heat exchanging fluid (7) not to be able to mix, sealing-tightness of the said wall is ensured either by simple compression of the plates with thin inserted sheets of a suitable sealing-tight material which is pre-cut (film of plastics elastomeric or rubber material or recompressed expanded graphite, etc.), or by per se known means, typically employing circular or radial grooves on the surface of the said plates and gaskets, adhesion, welding. With regard to the rigid assembly of the stacked plates, this is achieved by per se known means, typically by using rods with screw threaded ends which make it possible to maintain the said stack compressed.

The gas-liquid contactors according to the invention comprise per se known means of ensuring the supply and circulation of the said liquid and of the said heat exchanging fluid and also the circulation of the vapours surmounting the said liquid.

These gas-liquid contactors are particularly used for separating by evaporation-condensation a liquid mixture of which certain constituents are volatile (for example evaporation of sea water) and other steps, or in order to absorb a vapour, pure or diluted within an inert gas, in a non-volatile absorbent liquid (for example absorption of gaseous hydrogen chloride in water to form a solution of hydrogen chloride). The absorption may be followed by an exothermic or endothermic reaction in liquid phase.

EXAMPLES OF EMBODIMENT

EXAMPLE 1

This example corresponds to the first embodiment of the invention.

113 brass plates were produced having the form of the plate described with reference to FIG. 3b, by stamping from a brass plate 4 mm thick. The stamping tool makes it possible to form a circular groove (21) 0.5 mm deep and 2 mm wide.

Other geometrical parameters of the plate:
Angle A=120°
Outside radius Re of the plate=30 mm
Inside radius Ri of the annular part=25 mm (or of the base of the fin)
Radius Rt of the head of the fin=7.5 mm
Outer fins (13) 5 mm wide and to an angle of 60°.

The next stage was to produce an evaporation condensation apparatus as shown in FIG. 4b and comprising the gas-liquid contactor (1).

The illustration is on a scale of 1:2 except for the length of the contactor (L=500 mm) and the thickness of the plates (Ep=4 mm) which are not to scale for reasons of clarity.

The angle of angular offset Phi is 23.9° which corresponds to approx. 15 plates per turn of the spiral (pitch of the helix) and to 7.5 turns of the spiral for the entire height of the gas-liquid contactor.

For mounting and assembly, a rod with screwed ends (30)

10 mm in diameter and a steel tube (12) with an inside diameter of 72 mm was used, the rod (30) and the tube (12) being disposed and arranged on a metal base as shown in FIG. 4b. The details of preparation and mounting which are evident to a man skilled in the art simply by looking at the drawings will not be mentioned here.

It has been calculated that an equivalent helical exchanger according to the prior art would have a mean slope of 30.7°, a fin thickness of 14.38 mm and an exchange surface area of $13.4\,10^{-3}$ sq.m (upper face of the fin).

Tests Conducted

The apparatus produced was tested by studying the heating and desorption of an aqueous solution of LiBr (6), the heat exchanging liquid (7) being water.

The measurements related to the value of the heat transfer coefficient h at the interface of the "trickling film" and the fin as a function of the Reynolds number Re which characterises a flow of liquid.

Experimental Results

Firstly the following observations concerning the hydrodynamics of the trickling film over the spiral staircase-shaped support should be noted:
 below a first critical rate of flow, the film trickles over the upper surface of the fin;
 when this first critical rate of flow is increased, the film overspills and also trickles onto the under side so that the fin is entirely wetted by the film;
 when a second critical rate of flow is exceeded, the film becomes detached from the fin at the centre of the tube.

As the first critical rate of flow is very low and since the second is relatively high, the film trickles over both faces of the fin over the greater part of the range of fluctuation in the rate of flow, ensuring a very high level of heat exchange.

FIGS. 10a and 10b show the results obtained firstly with the gas-liquid contactor of Example 1 (curves I and dots marked by "o" on the graphs), and secondly with a straight smooth walled tube of the same material, height and inside radius (25 mm) serving as a control (curves II and points marked "x").

FIG. 10a relates to the heating of the trickling film and FIG. 10b to the desorption (separation of steam). It may be noted that the gas-liquid contactor according to the invention makes it possibly firstly to obtain flows over a wide range of Re (in contrast to the straight tube) and secondly to obtain very high levels of h which confirm the hypotheses advanced and show the interest which resides in a film flow with an alternation and an ad hoc proportion of the two limit types of flow already mentioned, the "piston" type flow and the "perfect mixer" type.

Although it would have been desirable, it was not possible having regard to the technical difficulties to carry out a control test with a tube with an inner helical passage with no treads or steps (smooth support).

EXAMPLE 2

Three gas-liquid contactors (marked M1, M2, M3) were produced in accordance with the second embodiment of the invention, similar to that shown in FIG. 6 and varying by the angle Phi as illustrated in FIG. 5c.

For this, 150 (3×50) copper plates were made up to the shape described with regard to FIG. 5a, by stamping from a copper plate 2 mm thick (Ep). The stamping tool makes it possible to form a circular groove (21) 0.4 mm and 2 mm wide.

Other geometrical parameters of the plate:
Angle B=25°
Outside radius Re of the plate=15 mm
Inside radius Ri of the annular part=10 mm
Radius Rs of the fin=50 mm.

Then, three gas-liquid contactors (1) were produced similar to that shown in FIG. 6 with the following parameters:
Height of the stack of plates: 120 mm
Number of plates: 50
Sealing-tightness provided by an annular seal 0.4 mm thick (compressed)

| * | angle Phi | Number of turns | Surface of fin (A) |
|---|---|---|---|
| M1 | 40° | 5.5 | 0.047 sq.m |
| M2 | 30° | 4.3 | 0.027 sq.m |
| M3 | 15° | 2 | 0.014 sq.m |

Outside tube (12) of transparent insulating plastics material.

Tests Conducted

The gas-liquid contactors produced (M1, M2, M3) were tested by studying the heating of water (6), the heat exchanging fluid (7) being water.

The measurements related to the value of the heat transfer coefficient h (in kW/sq.m.°K.) at the interface between the trickling film and the fin (FIG. 11a) and the HUT (in meters) (FIG. 11b) as a function of the Reynolds number Re which characterises the flow of water.

Experimental Results

As in the previous example and as a function of the rate of flow, the hydrodynamics of the trickling film on the spiral staircase-shaped support were observed. As in the case of Example 1, the presence of critical rates of flow were noted.

Measurements of heat transfer characterised by h and HUT, were conducted with contactors M1, M2 and M3 equipped with an outer tube (12) tangent on the ends of the external fins (11) so that the flows of liquid (6) (water) occurred without overspill.

FIGS. 11a and 11b show the results obtained firstly with the contactors M1, M2 and M3 of Example 2 (curves M1, M2 and M3—points marked "o" on the graphs), and secondly with control exchangers, a straight tube of the same material, the same height and outside diameter serving as a control and designated "TL" (curve TL—points noted "x"), and a helical passage graphite exchanger according to the prior art quoted and designated G2 (curve G2—points marked ".").

This exchanger G2 has the following characteristic features:

| | |
|---|---|
| * Radius of the basic tube | 30 mm |
| * Outside radius | 70 mm |
| * Width of fin | 40 mm |
| * Pitch of the fin | 16 mm |
| * Mean angle of slope | 3° |
| * Height | 120 mm |

With regard to the values of the coefficient h (FIG. 11a), it might be noted that it is not very sensitive to the rate of flow (proportional to Re) but that in contrast it varies greatly when the linear density of turbulence promoters increased: the contactor with spaced treads (M1) has values of coefficient h close to those of smooth walled exchangers (TL) or smooth spiral walled exchangers (G2). In contrast, the M2 and M3 contactors with a marked slope and therefore with a high density of steps have values of h which are three to four times greater, comparable with those obtained in Example 1.

With regard to the HUT (FIG. 11b), it is noted that the three contactors of the invention are markedly more efficient than the control exchangers.

However, it is important to note that the contactor M2 performs the best of the three contactors according to the invention in terms of overall criteria (HUT is inversely proportional to h. A, A being the area of film—support contact). This shows that in the case of M3, the higher value of h due to the considerable slope, is not sufficient to compensate for the reduction in A. Thus, for given working conditions, there is an optimum value of the angle Phi.

Complementary tests conducted with overspill have demonstrated that the performance of the contactor was further improved when the trickling film also flowed over the under side of the fins.

EXAMPLE 3

A gas-liquid contactor was produced according to the third embodiment of the invention (first alternative), similar to that shown in FIG. 7b.

For this, 50 copper plates were produced having the form of the plate described with reference to FIG. 7a, from a copper plate 4 mm thick (Ep).

Other parameters (notations on FIG. 7a):
D1=4 cm
D2=6 cm
D3=8 cm
D4=10 cm
Central hole 5 mm in diameter
Angle of a solid segment: 50°
Angle of an open work segment: 75°

These 50 plates were mounted on a central rod with screw threaded ends (30) 4 mm in diameter with an angle Phi of 60°, an annular seal (21) being inserted between each plate. A gas-liquid contactor was obtained which was 220 mm long, after compression of the plates (tightening of the screw threaded rod).

Values of h of the order of 5 to 10 kW/sq.m·°K. were obtained. Calculations have shown that with copper as the material, the heat transfer conductance between outer and central passages (16) was of the order of 30 kW/sq.m·°K. therefore greater than the value of h and was not therefore a factor limiting the transfer of heat. On the other hand, with graphite as the material, the heat transfer conductance between passages is close to h.

ADVANTAGES OF THE INVENTION

The invention describes a new concept of gas-liquid contactor which has the following essential advantages over the prior art:
- economic advantage (already developed) and facility to automate manufacture of the contactors according to the invention,
- technical advantage, as shown by the examples (considerable exchange capacity/unit of volume),
- considerable richness in the basic concept resulting in a wide variety of contactors to suit the needs which have to be met.

What is claimed is:

1. A trickling film gas-liquid contactor for the transfer of matter and heat between gas and liquid, comprising a helical support of heat conductive material permitting a liquid to be treated (evaporation or absorption) to flow by force of gravity in the form of a trickling film, a wall of heat conductive material and in thermal contact with the said support, separating in sealing-tight fashion the said liquid and a heat exchanging fluid, and is characterised in that the said helical support of the said liquid and the said wall are formed by a vertical stack of open work plates of heat conductive material, offset angularly in respect of one another by an angle Phi by rotation about the axis of the said helical support, each plate thus forming an element of the said support, like a step on a spiral staircase, and an element of the said wall, by means ensuring the rigid and sealing-tight assembly of the said plates in such a way as to obtain an evaporator or an absorber which is economical and efficient by virtue of the said support favouring the mixing of the said liquid and increasing the transfer of heat between the said liquid and the heat exchanging fluid.

2. A gas-liquid contactor according to claim 1 in which the said stack consists of plane and open work plates which are identical to one another.

3. A gas-liquid contactor according to any one of claims 1 and 2 in which the said plate comprises an annular part forming an element of the said wall and provided on the inside with at least one inner fin forming an element of the said support in order, by stacking of the said plates, to obtain a tube inside which the said liquid flows and the outer surface of which is in contact with the said heat exchanging fluid.

4. A gas-liquid contactor according to any one of claims 1 and 2 in which the said plate comprises an annular part forming an element of the said wall and provided on the outside with at least one external fin forming an element of the said support in order, by stacking of the said plates, to obtain a tube having on its outer surface a helical support intended for the flow of the said liquid and of which the inner surface is in contact with the said heat exchanging fluid.

5. A gas-liquid contactor according to anyone of claims 1 and 2 in which the said plate is constituted by an open work cylindrical plate provided with at least two different orifices in order to obtain by stacking of the said plates a cylinder provided on the inside with at least two helical passages allowing the parallel flow of the said liquid and of the said heat exchanging fluid.

6. A gas-liquid contactor according to claim 3 in which the ratio Re:Ep, Re being the outside radius of the said annular part and Ep being the thickness of the said plate, is comprised between 4 and 20.

7. A gas-liquid contactor according to claim 6 in which the ratio Eb:Ep, Eb designating the width of the said annular part (difference between Re, outside radius, and Ri, inside radius) is comprised between 0.5 and 5.

8. A gas-liquid contactor according to claim 7 in which the said inner fin takes the form of a portion of a ring or a segment, the angle A of the said segment or the sum of the angles of the said segments in the case of a plate comprising more than one segment, is comprised between 60° and 200° and is preferably comprised between 100° and 160°.

9. A gas-liquid contactor according to claim 3, comprising an insulating cylindrical casing concentrically surrounding the said stack with a gap between the said wall and the said casing to allow the circulation of the said heat exchanging fluid between the said wall and the said casing.

10. A gas-liquid contactor according to claim 9 in which the said annular part comprises on the outside at least two fins which are symmetrical in respect of the axis of the said helical support in order to facilitate centring and mounting of the said plates on the inside of the said insulating cylindrical casing and in order to achieve a helical circulation of the said heat exchanging fluid between the said tube and the said insulating casing.

11. A gas-liquid contactor according to claim 4 in which the said outer fin takes the form of a segment bounded in the radial direction by two sides tangent on the said annular edge and making between them an angle B comprised between −30° and +90°.

12. A gas-liquid contactor according to claim 11 in which the said outer fin takes the form of a segment bounded in the tangential direction by an arc of a circle of radius Rs the centre of which is that of the said annular part.

13. A gas-liquid contactor according to claim 12 in which the ratio Rs:Ep, Ep being the thickness of the said plate, is comprised between 3 and 30.

14. A gas-liquid contactor according to claim 13 in which the ratio Eb:Ep, Eb designating the width of the said annular part (difference between Re, outside radius, and Ri, inside radius) is comprised between 0.2 and 3.

15. A gas-liquid contactor according to claim 14 in which the said plate comprises two outer fins symmetrical in respect of the axis of the said helical support.

16. A gas-liquid contactor according to claim 11 comprising an insulating cylindrical casing internally tangent on the ends of the said external fins.

17. A gas-liquid contactor according to claim 11 in which the said annular part comprises on the inside at least one inner fin in order to ensure a helical flow of the said heat exchanging fluid and possibly an easy centring of the said plates.

18. A gas-liquid contactor according to claim 5 in which the said orifices take the form of portions of rings or segments which in the radial direction are bounded by two segments of straight lines concurrent with the axis of the said helical support and in the tangential direction by two arcs of a circle.

19. A gas-liquid contactor according to claim 18 in which the said plate comprises 2.n distinct orifices with an axial symmetry of the order n in respect of the axis of the said helical support (superimposition by rotation of 360°/n), n orifices being intended for the flow of the said liquid and n orifices being intended for the flow of the said heat exchanging fluid, with n greater than 1.

20. A gas-liquid contactor according to claim 19 in which the n orifices intended for the flow of the said liquid are situated on the outer annular part of the said plate, while the orifices intended for the flow of the said heat exchanging fluid are situated on the inner circular part of the said plate.

21. A gas-liquid contactor according to claim 19 in which the 2.n orifices form a succession of hollow segments separated by solid segments intended to ensure sealing-tightness between hollow segments.

22. A gas-liquid contactor according to claim 5 in which the said plate comprises two concentric annular parts separated by a sealing-tight annular zone, one on the inside carrying a fin intended for the flow of the said liquid, the other on the outside provided with an orifice in the upper part of the plate discharging onto a circular groove situated in the bottom part of the plate in order to allow the circulation of the said heat exchanging fluid over all or part of the circumference of the outer annular part.

23. A gas-liquid contactor according to claim 22 in which the said fin has one end as an arc of a circle and comprising an axial cylindrical core (34) so as to form a helical passage with no direct vertical communication.

24. A gas-liquid contactor according to claim 22 in which the said fin has a radial vertical cross-section of trapezoidal form, in such a way as to encourage the flow of the said liquid over the under side of the said fin, by overspill of the said liquid.

25. A gas-liquid contactor according to claim 1 in which the thickness of the plate Ep is comprised between 0.5 and 20 mm.

26. A gas-liquid contactor according to claim 25 in which the annular offset Phi between two successive plates in the said stack is comprised between 6° (60 plates per turn) and 90° (4 plates per turn).

27. A gas-liquid contactor according to claim 26 in which the height of the said stack is comprised between 200 and 2000 mm.

28. A gas-liquid contactor according to claim 27 in which the said heat conductive material is chosen from among the metals or metallic alloys, graphite.

29. A gas-liquid contactor according to claim 28 in which copper and copper alloys, aluminium and aluminium alloys or stainless steel when a high resistance to corrosion is desired, are chosen as the heat conductive material.

30. A gas-liquid contactor according to claim 1 in which, so that the said liquid and the heat exchanging fluid cannot mix, the sealing-tightness of the said wall is ensured with radial or circular grooves on the surface of the said plate, thin flat seals of plastic material or expanded and recompressed graphite, adhesion, welding, a solid assembly of plates being obtained with screw threaded rods which make it possible to maintain the said stack compressed.

31. A gas-liquid contactor according to claim 1 comprising means of ensuring the supply and circulation of the said liquid and of the said heat exchanging fluid and the circulation of the vapours surmounting the said liquid.

32. Use of a gas-liquid contactor according claim 1 to separate by evaporation-condensation a liquid mixture of which certain constituents are volatile while others are not.

33. Use of a gas-liquid contactor according to claim 1 for absorbing a vapour, pure or diluted within the heart of an inert gas, in a non-volatile absorbent liquid, which absorption is followed by an exothermic or endothermic reaction in liquid phase.

34. A gas-liquid contactor according to claim 19 in which n is equal to 2 or 3.

35. A gas-liquid contactor according to claim 26 in which the annular offset Phi between two successive plates in the stack is between 10° and 36°, from 10 to 36 plates per turn.

* * * * *